United States Patent Office 3,563,985
Patented Feb. 16, 1971

3,563,985
PROCESS FOR PREPARING CERTAIN ACYLAMINOISOTHIAZOLES
Gert P. Volpp, Princeton, and William A. Hills, Trenton, N.J., assignors to FMC Corporation, New York, N.Y., a corporation of Delaware
No Drawing. Filed Dec. 15, 1967, Ser. No. 690,796
Int. Cl. C07d 91/12
U.S. Cl. 260—247.1          5 Claims

ABSTRACT OF THE DISCLOSURE

Ureas, carbamates and thiocarbamates having a 3-or-5-isothiazolyl ring attached to one of the nitrogen atoms thereof are prepared by reacting a 3-or-5-isothiazolyl isocyanurate formed by pyrolysis of the 3-or-5-isothiazoloyl azide with the corresponding amine, alcohol or thiol and isolating the resulting product.

BACKGROUND OF THE INVENTION

(A) Field of the invention

This invention relates to isothiazoles and in particular to isothiazole derivatives of ureas, carbamates and thiocarbamates and a method of preparing them and their use as agricultural chemicals.

(B) Description of the prior art

The formation of isocyanates from acyl azides is well known, being commonly referred to as the Curtius reaction after its discoverer. The reaction is usually carried out by mildly pyrolyzing an acyl azide which then undergoes molecular rearrangement to the corresponding isocyanate with concurrent expulsion of elemental nitrogen.

It is generally agreed that the loss of nitrogen produces an electronically deficient nitrogen atom which acquires stability by rearrangement to an isocyanate structure. The course of the reaction can be depicted by reference to the following equation:

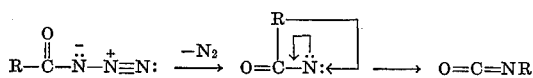

When carried out in the presence of a nucleophile such as a primary or secondary amine, alcohol, phenol or thiol, these add to the isocyanate function thereby forming the corresponding urea, carbamate or thiocarbamate. It is this version of the Curtius reaction which has made it valuable and important in the realm of synthetic organic chemistry.

Desiring to investigate the biological properties of certain new derivatives of isothiazole in which the isothiazole ring bears a single functional substituent of the class urea, carbamate and thiocarbamate, we sought to prepare such compounds utilizing the Curtius synthesis. To this end, we prepared all the isothiazolyl azides, i.e., the 3, 4 and 5 position isomers, and subjected them to the Curtius rearrangement in the presence of aforenamed nucleophiles. Whereas the 4-isothiazolyl azide behaved normally and gave the expected derivatives when heated with an amine, alcohol or thiol, the 3- and 5-isomers failed to undergo the Curtius reaction. Subsequent investigation revealed that the azide group was eliminated and replaced by the negative fragment of the nucleophiles thereby forming the corresponding amide or ester derivative of the nucleophile. The following equation illustrates the abnormal behavior of the 3- and 5-isothiazoloyl azides:

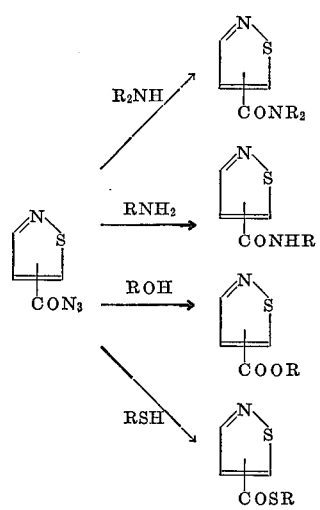

SUMMARY OF THE INVENTION

It has now been discovered that isothiazoles having a urea, carbamate or thiocarbamate function attached to the 3- or 5-position of the isothiazole ring can be prepared by heating 3- or 5-triisothiazolyl isocyanurate, formed from the corresponding isothiazoloyl azide in the absence of a nucleophile, with a primary or secondary amine, an ol or thiol and the provision of such a method including new isothiazole derivatives of urea, carbamic acid and thiocarbamic acid produced thereby and their use as herbicides constitutes the principal object and purpose of this invention. Other objects and purposes will be made apparent in the ensuing description.

GENERAL DESCRIPTION AND PREFERRED EMBODIMENTS

In carrying out the invention, the 3- or 5-isomer of triisothiazolyl isocyanurate is prepared by heating the corresponding isothiazoloyl azide to a sufficiently high temperature to effect elimination of nitrogen. Generally speaking, relatively mild temperatures are adequate and in this connection we have achieved excellent results by warming the azide in a relatively inert organic solvent. Suitable solvents are those which are inert to the azide group such as the normally liquid ethers, hydrocarbons and chlorinated hydrocarbons. Examples include benzene, xylene, toluene, chlorobenzene, heptane, dimethoxyethane and the like. Manifestly the solvent system should be free of active nucleophiles since these would react with the 3- or 5-isothiazolyl azides as described above. The resulting triisothiazolyl isocyanurate is a high melting solid which can be isolated by filtration from the reaction mixture. The structure of the parent isomeric forms are as follows:

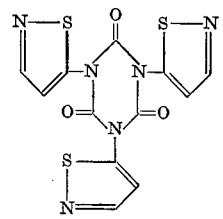 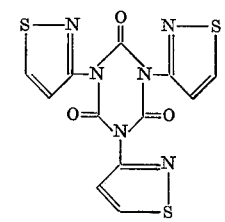

triisothiazol-5-yl isocyanurate    triisothiazol-3-yl isocyanurate

The requisite isothiazoloyl azide is obtained in the known manner from the isothiazole acid chloride and sodium azide or by the treatment of the isothiazole hydrazide with nitrous acid.

In the second step of the process herein, the aforedescribed triisothiazolyl isocyanurate is reacted with the appropriate nucleophile to produce the desired isothiazole derivative. In the case of the urea derivatives, the nucleophile is a primary or secondary amine; in the case of a carbamate derivative, the nucleophile is an ol such as an alcohol or phenol while a thiol gives rise to thiocarbamate derivatives. In general, the reaction is effected by heating the requisite molar ratio of triisocyanurate and nucleophile after which the resulting isothiazole derivative is isolated from the reaction mixture in the usual way, most commonly by crystallization. The reaction can be conducted with or without a solvent. A convenient procedure is to heat the components in a refluxing inert organic solvent of the aforementioned type.

Isothiazole ureas, carbamates and thiocarbamates of the type realizable by our new synthesis can be visualized by reference to the following formulae

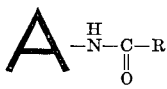

wherein R can be

in which each of $R_1$ and $R_2$ designates hydrogen, lower alkoxyl, lower dialkylamino, an aliphatic group such as lower alkyl, lower alkenyl, lower alkynyl, cycloalkyl of 5 to 7 carbon atoms, aromatic carbocyclic, e.g. phenyl or naphthyl, a 5 to 6 numbered heterocyclic ring such as pyridyl, thiazolyl, isothiazolyl, pyrazolyl, etc. while together $R_1$ and $R_2$ can complete a heterocyclic secondary amino radical such as morpholino, pyrrolidinyl, piperidinyl and the like, it being provided that one of $R_1$ and $R_2$ is always substituted, it being further provided that where $R_1$ is equal to lower alkoxyl or lower dialkylamino, $R_2$ is hydrogen; $OR_3$ and $SR_3$ wherein $R_3$ is a lower aliphatic radical, while A represents a 3- or 5-isothiazolyl ring. As used herein, lower aliphatic means 1 to 5 carbon atoms in the group.

The herein 3- and 5-triisothiazolyl isocyanurates are also patentably new entities as well as their isothiazolyl azide precursors having the formula

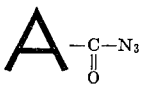

The isothiazoles of the invention constitute a class of chemical compounds having useful and valuable properties being especially active as broad spectrum and selective herbicides. Of particular importance in this connection are the isothiazolylureas. A preferred series of derivatives of these have the following formula

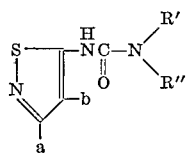

wherein each of $a$ and $b$, which may be alike or different, refer to hydrogen, alkyl of 1–3 C-atoms, fluorine, chlorine and bromine; each of R' and R" is hydrogen, a lower alkyl radical, lower alkoxy or lower dialkylamino, a phenyl radical, a 5 to 6 membered heterocyclic radical such as pyridine, thiazole, etc., or together R' and R" can complete a heterocyclic secondary amino group such as morpholine, pyrrolidine, piperidine or the like, it being provided that one of R' and R" is always substituted, it being further provided that where R' is equal to lower alkoxyl or lower dialkylamino, R" is hydrogen.

Certain classes of isothiazolyl ureas are known chemical entities and in this connection reference is made to Netherlands patent application 6605902 which describes, 1,1'-disubstituted 3-(3-methylisothiazol-5-yl) ureas and how to use them as herbicides.

A particular isothiazolyl urea obtainable by our process and having the structure

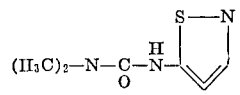

is unusual in exhibiting specific herbicidal properties. This is unexpected since the herbicidally active isothiazolyl ureas are normally of the broad spectrum type.

The aforedescribed compound is disclosed and claimed in Ser. No. 659,312, filed Aug. 9, 1967 in the name of Gert P. Volpp and Luc R. Vannoorbeeck.

Exemplary carbamates herein have the following formula wherein $R_3$, $a$ and $b$ have the significance as above set forth:

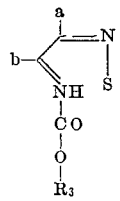

Reference is now made to the following non-limiting examples.

EXAMPLE 1

1,3,5-triisothiazol-5-yl isocyanurate

A solution of 13.26 g. of sodium azide in 300 ml. of peroxide free 1,2-dimethoxyethane was placed in a one liter three-necked flask equipped with a stirrer, a condenser and a dropping funnel. A soluton of 24.60 g. (0.17 mole) of isothiazole-5-carboxylic acid chloride in 100 ml. of 1,2-dimethoxyethane was added dropwise with stirring over a 20 minutes period. Stirring at room temperature was continued for 18 hours, then the mixture was filtered and the filtrate carefully evaporated under reduced pressure while keeping the temperature below 40° C. The colorless oil was dissolved in 200 ml. of benzene, filtered, and slowly warmed on a steam bath until the evolution of nitrogen ceased. The yellow-green solid which precipitated was collected by filtration (17.0 g., M.P. 258–260/272–274° C. under decomposition). The structure of 1,3,5-triisothiazol-5-yl isocyanurate was assigned based on a molecular weight determination (374), mol. weight calculated 378, IR- and Mass-spectroscopic data. IR 6.00 and 6.15μ.

*Analysis.*—Calc'd for $C_{12}H_6N_6S_3O_3$ (percent): C, 38.11; H, 1.60. Found (percent): C, 38.36; H, 1.78.

The isothiazole-5-carboxylic acid chloride was prepared as follows:

A suspension of 25.8 of isothiazole-5-carboxylic acid—prepared according to U.S. Patent 3,145,214—in 100 ml. of thionyl chloride was warmed under reflux until evolution of hydrochloride ceased. The solution was diluted with 100 ml. of benzene and distilled in vacuo. The final fractions (27.1 g., B.P. 32° C./0.25 mm.) were identified by IR- and NMR-spectra to be isothiazole-5-carbonyl chloride.

EXAMPLE 2

1-(isothiazol-5-yl)-3-n-pentylurea

A mixture of 4.20 g. of 1,3,5-triisothiazol-5-yl isocyanurate and 3.84 g. of n-pentylamine in 100 ml. of dry benzene was heated at the reflux temperature until the greenish yellow color of the isocyanurate had disappeared (six hours). The solvent was removed under reduced pressure and the resulting residue recrystallized from acetone-ether giving 5.10 g. (74% yield) of white crystals; M.P. 117–119° C. The structure was confirmed by instrumental analysis.

EXAMPLE 3

1-tert-butyl-3-(isothiazol-5-yl)urea

A mixture of 4.20 g. of 1,3,5-triisothiazol-5-yl isocyanurate and 2.91 g. of tert-butylamine in 100 ml. of benzene was heated at reflux for 12 hours. The solvent was removed under reduced pressure, the residue taken up in acetone and filtered; 0.5 g. of isocyanurate was recovered. Addition of ether to the filtrate and cooling gave 3.40 g. of white crystals which melted after undergoing several crystal changes at 260–262° C.

*Analysis.*—Calc'd for $C_8H_{13}N_2SO$ (percent): C, 48.23; H, 6.58. Found (percent): C, 48.35; H, 6.87.

EXAMPLE 4

1-cyclohexyl-3-(isothiazol-5-yl)urea

A mixture of 4.30 g. of 1,3,5-triisothiazol-5-yl isocyanurate and 4.0 g. of cyclohexylamine in 100 ml. of dry benzene was heated at the reflux temperature for 7 hours. The hot mixture was filtered leaving 2.30 g. of starting isocyanurate. The filtrate was evaporated giving 2.59 g. (72% yield) of a white solid melting at 169–170° C. It could be crystallized from acetone, or a chloroform-benzene mixture.

*Analysis.*—Calc'd for $C_{10}H_{15}N_3SO$ (percent): C, 53.32; H, 6.71. Found (percent): C, 53.38; H, 6.88.

EXAMPLE 5

1-(isothiazol-5-yl)-3-isopropylurea

A mixture of 4.20 g. of 1,3,5-triisothiazol-5-yl isocyanurate and 3.0 g. of isopropylamine in 100 ml. of dry benzene was heated at the reflux temperature for 4 hours. The mixture was filtered to remove the insoluble uretidinedione by products while the filtrate was evaporated to dryness and the residue recrystallized from acetone-ether giving 2.70 g. (45% yield) of crystals which melted at 143–146° C.

*Analysis.*—Calc'd for $C_7H_{11}N_3SO$ (percent): C, 45.40; H, 5.99. Found (percent): C, 45.50; H, 6.14.

EXAMPLE 6

1-methyl-1-phenyl-3-(isothiazol-5-yl)urea

A mixture of 4.20 g. of 1,3,5-triisothiazol-5-yl isocyanurate and 4.30 g. of N-methylaniline in 100 ml. of dry toluene was heated at the reflux temperature for 23 hours. The hot mixture was filtered to remove 0.5 g. of solid and the filtrate evaporated to dryness. The residue was recrystallized from acetone-ether giving 3.40 g. (46.6%) of white crystals which melted at 189–191° C.

*Analysis.*—Calc'd for $C_{11}H_{22}N_3SO$ (percent): C, 56.65; H, 4.75. Found (percent): C, 56.90; H, 4.74.

EXAMPLE 7

1,1-pentamethylene-3-(isothiazol-5-yl)urea

A mixture of 1,3,5-triisothiazol-5-yl isocyanurate and 5.10 g. of piperidine in 100 ml. of benzene was heated at the reflux temperature for 8 hours. The benzene was removed by evaporation and the residue recrystallized from acetone giving 4.71 g. (67% yield) of white crystals which melted at 203–205° C.

*Analysis.*—Calc'd for $C_9H_{13}N_2SO$ (percent): C, 51.17; H, 6.50. Found (percent): C, 51.13; H, 6.47.

EXAMPLE 8

1-[N-(isothiazol-5-yl)carbamoyl]morpholine

Using the procedure of Example 7, 4.20 g. of the isocyanurate and 6.69 g. of morpholine in 100 ml. of benzene was heated at the reflux temperature for 8 hours. The pale yellow precipitate which formed was collected on a filter and recrystallized from acetone giving 6.0 g. of white needles which melted at 195–198° C.

*Analysis.*—Calc'd for $C_8H_{11}N_2SO_2$ (percent): C, 45.07; H, 5.20. Found (percent): C, 44.29; H, 5.20.

EXAMPLE 9

1-dimethylamino-3-(isothiazol-5-yl)urea

A mixture of 4.20 g. of 1,3,5-triisothiazol-5-yl isocyanurate, 240 g. of N,N-dimethylhydrazine in 100 ml. of benzene was heated at the reflux temperature for 8 hours. The hot mixture was filtered to remove the 0.5 g. of the uretidinedione and the filtrate evaporated to dryness. The resulting solid was recrystallized from acetone-cyclohexane. The white solid melted at 198–200° C.

*Analysis.*—Calc'd for $C_6H_{10}N_4SO$ (percent): C, 38.71; H, 5.41. Found (percent): C, 38.84; H, 5.63.

EXAMPLE 10

Methyl N-(isothiazol-5-yl) carbamate

A suspension of 4.20 g. of triisothiazol-5-yl isocyanurate in 100 ml. of methanol was heated on a steam bath for 24 hours. After filtering to remove 0.35 g. of the insoluble uretidinedione, excess methanol was evaporated and the resulting solid crystallized from acetone gave 4.30 g. (82%) of odorless prisms which melted at 199–200° C.

*Analysis.*—Calc'd for $C_5H_6N_2SO_2$ (percent): C, 37.98; H, 3.83. Found (percent): C, 37.81; H, 3.76.

EXAMPLE 11

Tri(3-methylisothiazol-5-yl) isocyanurate

A solution of 8.05 g. of 3-methylisothiazoloyl azide in 100 ml. of benzene was heated at the reflux temperature until the evolution of nitrogen stopped. The greenish yellow precipitate which formed during the reaction was collected on a filter (6.72 g., 94% yield). This material decomposed without melting at 269–271° C. Its structure was confirmed by instrumental analysis. The azide is described in U.S. Patent 3,144,452.

EXAMPLE 12

1,3,5-triisothiazol-3-yl isocyanurate

A solution of 10.5 g. of isothiazole-3-carbonyl azide in 100 ml. of benzene was warmed under reflux for four hours. The pale yellow which separated was collected by filtration: 7.6 g., M.P. 224–225° C. Its IR-analysis showed it to be 1,3,5-triisothiazol-3-yl isocyanurate.

The azide was prepared by adding a solution of 6.45 g. of isothiazole-3-carbonyl chloride in 65 ml. of absolute ether under vigorous stirring to a cold (5° C.) solution of 5.85 g. of sodium azide in 60 ml. of water. When the addition was complete the mixture was stirred for another 2.5 hours. The ethereal phase was separated and the aqueous phase extracted with two portions of 100 ml. of ether. The combined ethereal phases were dried over sodium sulfate and the ether removed in vacuo. The residual oil was identified as the azide by IR-analysis.

The acid chloride was obtained by warming 6.45 g. of isothiazole-3-carboxylic acid under reflux in 35 ml. of thionyl chloride until evolution of hydrogen chloride ceased. The excess thionyl chloride was removed in vacuo and eventually by volatilization with benzene. The acid is described in J.C.S. (1965) 7277.

EXAMPLE 13

1,1-dimethyl-3-(isothiazol-3-yl)urea

A solution of 7.6 g. of 1,3,5-triisothiazol-3-yl isocyanurate in 10 ml. of benzene and ca. 15 ml. of dimethylamine was warmed in a sealed tube to 80° for 14 hours. The solid reaction product was recrystallized from hot ethanol. 1,1-dimethyl-3-(isothiazol-3-yl)urea melted at 265–271° C. The IR- and NMR-spectra were consistent with the assigned structure.

What is claimed is:
1. A process of preparing a monosubstituted monosubstituted isothiazole of the formula

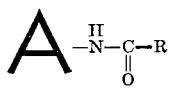

wherein A represents a 3- or 5-isothiazolyl ring optionally substituted by alkyl of 1–3 C-atoms, fluorine, chlorine, or bromine; R is selected from the group consisting of

wherein $R_1$ and $R_2$ are each selected from the group consisting of hydrogen, lower alkoxyl, lower dialkylamino, lower alkyl, lower alkenyl, lower alkynyl, cyclopentyl, cyclohexyl, phenyl, naphthyl, pyridyl, thiazolyl, isothiazolyl and pyrazolyl while taken together $R_1$ and $R_2$ can complete a heterocyclic secondary amino group of the class morpholino, pyrrolidino and piperidino it being provided that one of $R_1$ and $R_2$ is always substituted and the further proviso that where $R_1$ is equal to lower alkoxyl or lower dialkylamino, $R_2$ is always hydrogen; —$OR_3$ and —$SR_3$ wherein $R_3$ is selected from the group consisting of lower alkyl which comprises reacting a triisothiazolyl isocyanurate of the formula

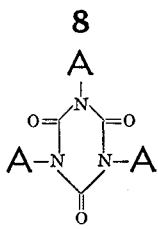

said isothiazolyl isocyanurate being formed by the pyrolysis of the requisite isothiazoloyl azide, with a nucleophile selected from the class consisting of $HNR_1R_2$, $R_3OH$ and $R_3SH$ and isolating the resulting product.

2. The process of claim 1 wherein the nucleophile is a primary amine.

3. The process of claim 1 wherein the nucleophile is a secondary amine.

4. The process of claim 1 wherein the nucleophile is an alcohol.

5. The process of claim 1 wherein the nucleophile is a thiol.

No references cited.

ALEX MAZEL, Primary Examiner

R. J. GALLAGHER, Assistant Examiner

U.S. Cl. X.R.

71—90; 260—248, 293,4, 294.8, 302, 306.8